No. 825,417. PATENTED JULY 10, 1906.
E. RIVETT.
BALL BEARING.
APPLICATION FILED AUG. 5, 1905.
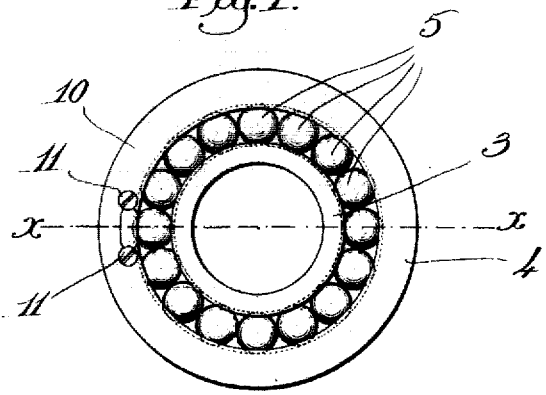
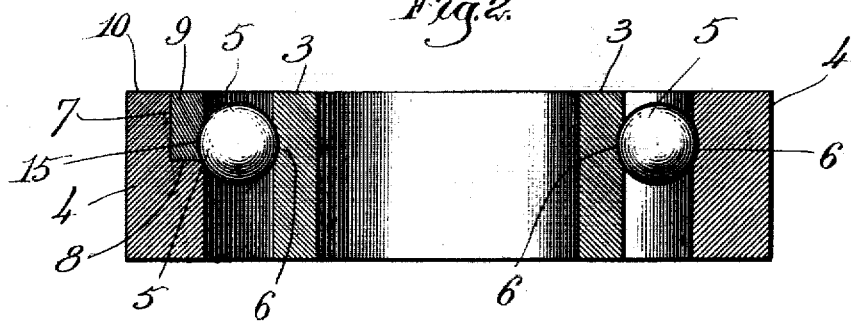
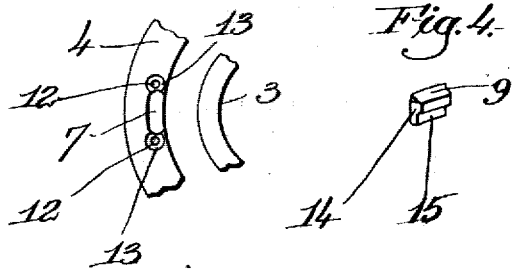
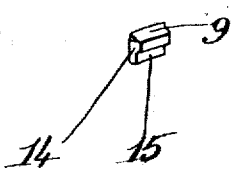
Witnesses.
Thomas J Drummond
Walter N Trott
Inventor.
Edward Rivett,
by Crosby Gregory Attys.

UNITED STATES PATENT OFFICE.

EDWARD RIVETT, OF BOSTON, MASSACHUSETTS.

BALL-BEARING.

No. 825,417.

Specification of Letters Patent.

Patented July 10, 1906.

Application filed August 5, 1905. Serial No. 272,814.

*To all whom it may concern:*

Be it known that I, EDWARD RIVETT, a citizen of the United States, residing at Boston, county of Suffolk, and State of Massachusetts, have invented an Improvement in Ball-Bearings, of which the following description, in connection with the accompanying drawings, is a specification, like numerals on the drawings representing like parts.

The object of the present invention is to provide a ball-bearing in which there is a limited amount of material in the bearing members with novel means for removing or inserting the balls in the ball-race, the features of my invention being more fully hereinafter described and then pointed out in the claims.

In the drawings, Figure 1 is a side elevation of the essential elements of a ball-bearing, showing my invention applied thereto. Fig. 2 is a section on the line x x, Fig. 1. Fig. 3 is a detail of a portion of the two members of the ball-bearing, showing the key removed to admit the balls into the ball-race; and Fig. 4 is a detail view of the retaining-key.

3 and 4 designate the two members of a ball-bearing between which the balls 5 are confined, each of the members 3 and 4 having therein a ball-race 6, in which the balls 5 travel. I have shown in the drawings only these two bearing members of a ball-bearing, although it will be understood that the member 3 may be in the form of a shaft or a spindle and the member 4 constitute the hub for any wheel or rotating part.

My invention, however, has been particularly designed to permit of the quick insertion of the balls in the ball-race or their removal therefrom in a ball-bearing in which there is a limited amount of stock or material in the outer bearing member 4—as, for instance, where said bearing member is in the form of an annular member such as shown in the drawings with a comparatively small cross-sectional area.

To admit the balls to the ball-race, I form in the inner face of the outer bearing member 4 a groove 7, which extends to the ball-race and the end 8 of which is only just sufficiently beyond the center of the ball-race to permit the balls to be inserted. When the groove is open, as shown in Fig. 3, the balls 5 may be dropped into the ball-race opposite said groove, and when a sufficient number of balls have been placed in the ball-race the groove 7 is closed by a ball-retaining key 9, which is of a shape to fill the groove and to come flush with the side face 10 of the bearing member 4. Said retaining member is held in the groove by means of retaining-screws 11, which enter suitable holes 12 for the bearing member 4 and whose heads overlap the ends of the retaining member, as shown in Fig. 1. The holes for the screws are preferably countersunk, so that when the screws are in place the heads come flush with the side face 10 of the bearing member 4.

The groove 7 is preferably a dovetailed groove, it being conveniently made by drilling into the side face of the bearing member 4 at two points sufficiently separated so that when the material between said drill-holes is removed the groove 7 is formed. In this way the sides 13 of the groove are rounded and a dovetailed groove is formed. The edges 14 of the retaining member are shaped to fit the sides 13 of the groove. By thus making a dovetailed groove and a dovetailed ball-retaining key said key can only be removed by withdrawing it from the top of the groove, and the screws 11 are sufficient to hold it in place. The inner end of the retaining-key is shaped at 15 to conform to and form part of the ball-race in the bearing member 4. In order to properly insert the key 9 after the balls have all been placed in position, it will be necessary to shift the balls in the raceway until said key 9 occupies a space midway between two adjacent balls. By making the retaining-key comparatively thin and by placing the groove 7 for the key in the inner face of the bearing member 4 and also by extending said groove only to the ball-race, so that the balls must all be admitted from one side, a minimum amount of material is removed from the bearing member 4 in forming the groove and said member is not materially weakened.

My invention is applicable to ball-bearings in automobile-wheels. The ball-bearings for these wheels are commonly made by forcing into a casing or cage in the hub of the wheel the outer bearing member 4 of the ball-bearing, and in order to remove the balls it has heretofore been necessary to force the bearing member 4 out from the case or cage. With my improvement, however, the balls may be easily inserted or withdrawn by simply removing the retaining-key, and the presence of the groove 7 in the outer bearing member does not appreciably weaken it.

Having fully described my invention, what I claim as new, and desire to secure by Letters Patent, is—

1. In a ball-bearing, two bearing members, one of which is adapted to rotate within the other, each bearing member having a ball-race, and balls in said race between said members, one of said members having in its inner face a ball-supply groove extending from a side face of said member parallel to the axis of rotation and leading to and terminating at the ball-race, a ball-retaining key detachably held in said groove, said key having its inner end shaped to conform to and form part of the ball-race of the bearing member in which it is located and means on said side face for holding the key in place.

2. In a ball-bearing, an inner bearing member having an exterior ball-race, an annular bearing member surrounding the first-named bearing member, said annular bearing member having on its interior side a ball-race, balls in said race, said annular bearing having in its inner face a dovetailed ball-supply groove extending from a side face of said member parallel to the axis of rotation and leading to but terminating at the ball-race, a dovetailed ball-retaining key detachably held in said groove, the inner end of said key being shaped to conform to and form part of the ball-race, and a screw entering said side face and holding the key in place.

In testimony whereof I have signed my name to this specification in the presence of two subscribing witnesses.

EDWARD RIVETT.

Witnesses:
 LOUIS C. SMITH,
 MARGARET A. DUNN.